United States Patent
Lawlis

(10) Patent No.: US 9,531,750 B2
(45) Date of Patent: Dec. 27, 2016

(54) SPOOFING DETECTION

(71) Applicant: Ford Global Technologies, LLC, Dearborn, MI (US)

(72) Inventor: James Martin Lawlis, Grosse Pointe Farms, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/715,696

(22) Filed: May 19, 2015

(65) Prior Publication Data
US 2016/0344766 A1  Nov. 24, 2016

(51) Int. Cl.
G06F 11/00 (2006.01)
H04L 29/06 (2006.01)
B60R 16/023 (2006.01)
H04L 29/08 (2006.01)

(52) U.S. Cl.
CPC ......... *H04L 63/1466* (2013.01); *B60R 16/023* (2013.01); *H04L 63/1425* (2013.01); *H04L 67/12* (2013.01)

(58) Field of Classification Search
CPC .......................... H04L 63/1466; H04L 63/1425
USPC ..................................................... 726/22–30
See application file for complete search history.

(56) References Cited

U.S. PATENT DOCUMENTS

| | | | |
|---|---|---|---|
| 7,707,638 B2* | 4/2010 | Dellow | G06F 21/64 713/188 |
| 8,121,624 B2 | 2/2012 | Cai et al. | |
| 8,874,926 B1* | 10/2014 | Edwards | G06F 21/75 713/180 |
| 2003/0149870 A1 | 8/2003 | Wookey et al. | |
| 2004/0268138 A1* | 12/2004 | Larson | G06F 21/85 726/26 |
| 2005/0028004 A1* | 2/2005 | Dellow | G06F 12/1441 726/26 |

(Continued)

FOREIGN PATENT DOCUMENTS

| KR | 10-1434155 | 8/2014 |
|---|---|---|
| WO | WO 2015012934 | 1/2015 |

OTHER PUBLICATIONS

Osanaiye et al., "TCP/IP header classification for detecting spoofed DDoS attack in Cloud environment," EUROCON 2015—International Conference on Computer as a Tool (EUROCON), IEEE Year: 2015 pp. 1-6.*

(Continued)

*Primary Examiner* — Roderick Tolentino
(74) *Attorney, Agent, or Firm* — Frank A. MacKenzie; Bejin Bieneman PLC

(57) ABSTRACT

A method for preventing spoofing in an automotive network, the method comprising storing at least one address of a first vehicle electronic control unit and detecting at least one message from a plurality of second electronic control units on a vehicle communications bus, the at least one message having an originating address that matches the at least one address of the electronic control unit and determining that said at least one message was sent by a source other than the electronic control unit; and generating and transmitting a negative acknowledgment (NACK) message to at least one module on the bus in the automotive network, instructing the plurality of second electronic control units to take no action on the at least one message.

18 Claims, 3 Drawing Sheets

(56) References Cited

U.S. PATENT DOCUMENTS

| | | | |
|---|---|---|---|
| 2010/0325720 A1* | 12/2010 | Etchegoyen | H04L 63/1408 726/17 |
| 2013/0104231 A1* | 4/2013 | Niner | H04L 63/1416 726/23 |
| 2013/0279695 A1 | 10/2013 | Rubin et al. | |
| 2015/0195297 A1* | 7/2015 | Ben Noon | B60R 16/023 726/22 |
| 2015/0363596 A1* | 12/2015 | DeCesaris | G06F 21/554 726/23 |
| 2016/0103996 A1* | 4/2016 | Salajegheh | G06F 11/3024 726/25 |

OTHER PUBLICATIONS

Sun et al., "Security and Privacy in the Internet of Vehicles," 2015 International Conference on Identification, Information, and Knowledge in the Internet of Things (IIKI) Year: 2015 pp. 116-121.*

Koopman, et al., "Integrity in Embedded Control Networks", www.computer.org/security, co-published by the IEEE Computer and Reliability Societies, May/Jun. 2013 (3 pages).

* cited by examiner

SPOOFING DETECTION

BACKGROUND

The modern automobile typically has many, e.g., up to seventy, electronic control units (ECUs) for various systems and subsystems. The most powerful ECU in terms of processing power is typically an engine control unit. Other ECUs are used for transmission, airbags, antilock braking/ABS, cruise control, electric power steering, audio systems, power windows, doors, mirror adjustment, battery and recharging systems for hybrid and electric cars, etc. Some of these ECUs form independent subsystems, but nonetheless communications among ECUs is generally essential.

A controller area network (CAN) bus standard was devised, and is well known, to allow microcontrollers, such as in an ECU and other devices in a vehicle, to communicate with each other in applications without a host computer. CAN is a message-based protocol, designed originally for automotive applications, but is also used in many other contexts. A CAN bus uses serial communication for sending and receiving messages. Serial communication refers to the process of sending data one bit at a time, sequentially, over a communication channel, such as a vehicle's communication bus.

Spoofing is a situation in which a computing entity and/or program successfully masquerades as another by falsifying data and thereby gaining illegitimate access to a system or a network. Spoofing of a message on a vehicle communications bus typically involves masquerading as an ECU module and placing messages on the vehicle's communications bus as if the masquerading ECU module was the legitimate source of the message. The masquerading ECU module may send messages onto the bus. Receiving modules on the bus may act on the messages, unaware of their true source. The consequences of a vehicle acting on spoofed messages can be severe.

DETAILED DESCRIPTION

Figure 1:
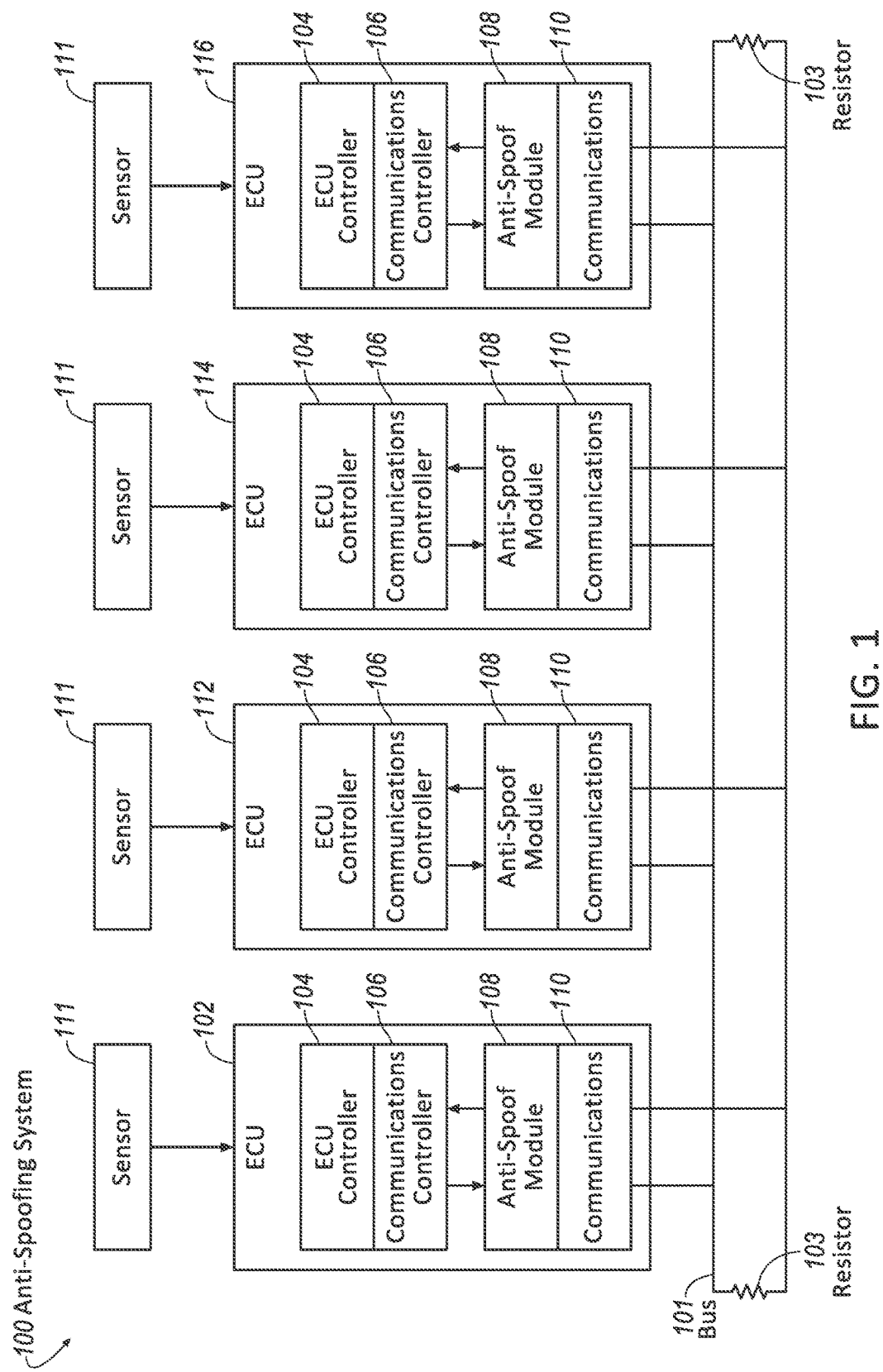
FIG. 1 is a block diagram on an exemplary vehicle bus anti-spoofing system.

FIG. 1 is a block diagram of an exemplary vehicle bus anti-spoofing system 100. A sensor 111 is connected to an electronic control unit (ECU) 102, e.g., in a known manner. The ECU 102 has a controller 104, which is in communication with a communications controller 106. The communications controller 106 is connected to an anti-spoof module 108. The anti-spoof module 108 is communicatively coupled to a communications transceiver 110. The communications transceiver 110 is in turn communicatively coupled to a bus 101 of an automotive network. The bus 101 has an impedance terminating resistor 103 at each end of the bus 101.

The controller 104 may include one or more processors, such as microprocessors or microcontrollers. The controller 104 may also have a memory, such as a readable only memory (ROM) to store instructions to be executed by the processor and random access memory (RAM) to temporarily store data or hold register information. The ECU 102 can use the microprocessors to process a sensor reading from the sensor 111 (e.g., engine sensors, such as fuel injection sensors, timing devices, oxygen sensors, coolant sensors, air intake sensors, etc.), and in response, transfer this information to other vehicle components, such as ECU 112, ECU 114 and ECU 116 or devices, e.g., instrument lights, vehicle lights, horns and the like in the vehicle according to their respective functions. Each ECU must have a unique address when attached to the bus 101 to avoid confusion. For example, ECU 102, ECU 112, ECU 114 and ECU 116 can have the unique ECU hexadecimal addresses of 1A0h, 2B0h, 3AFh and 008h, respectively.

The communications controller 106 can be for example, a controller area network (CAN) controller and is often an integral part of the processor of the controller 104. The communication controller 104 can contain a processor to execute instructions. When receiving data, the communications controller 106 stores the received serial bits it receives from the bus 101 until an entire message is available. The message can then be retrieved by the controller 104 processor. The communication controller can trigger an interrupt in the controller 104 processor alerting the processor that a new message has been received. When sending data, the controller 104 processor sends messages to be placed onto the bus 101 via the communications controller 106.

The anti-spoof module 108 is located between the communications controller 106 and the communication transceiver 110. The functionality of the anti-spoof module can be accomplished in hardware, software or a combination thereof. Examples of implementation of the anti-spoof module 108 are discussed below. In operation, the anti-spoof module 108 monitors the bus 101 via the communication transceiver 110 and detects when a received message on the bus 101 has an originating address that matches the outgoing address of the ECU 102 and the received message was not sent by the ECU 102. The anti-spoof module 108 will immediately send a series of six consecutive dominant bits to the bus 101 via the communication transceiver 110, before the spoofed message can complete, thus negating the spoofed message (further discussed below). The six bits comprise an "Active Error Flag" according to the CAN Bus standard, is the Active Error Flag and constitutes a negative acknowledgement (NACK) message from the ECU 102, informing any modules on the bus 101 that a spoof message was received. Advantageously, the ECU 102 NACK message will cause this spoofed message to be disregarded by the modules on the bus 101.

As is known, CAN bus data transmissions use a lossless bit-wise arbitration method of contention resolution. This arbitration method requires all nodes on the CAN network to be synchronized to sample every bit on the CAN network at substantially simultaneously. The CAN specifications use the terms "dominant" bits and "recessive" bits as follows. Dominant is a logical 0 (actively driven to a voltage by the transmitter), and recessive is a logical 1 (passively returned to a voltage by a resistor). The idle state is represented by the recessive level (Logical 1). If one node transmits a dominant bit and another node transmits a recessive bit then there is a collision and the dominant bit "wins." This means there is no delay to the higher-priority message, and the node transmitting the lower priority message automatically attempts to re-transmit six bit clock cycles after the end of the dominant message. This makes CAN very suitable as a real time prioritized communications system.

Figure 2:
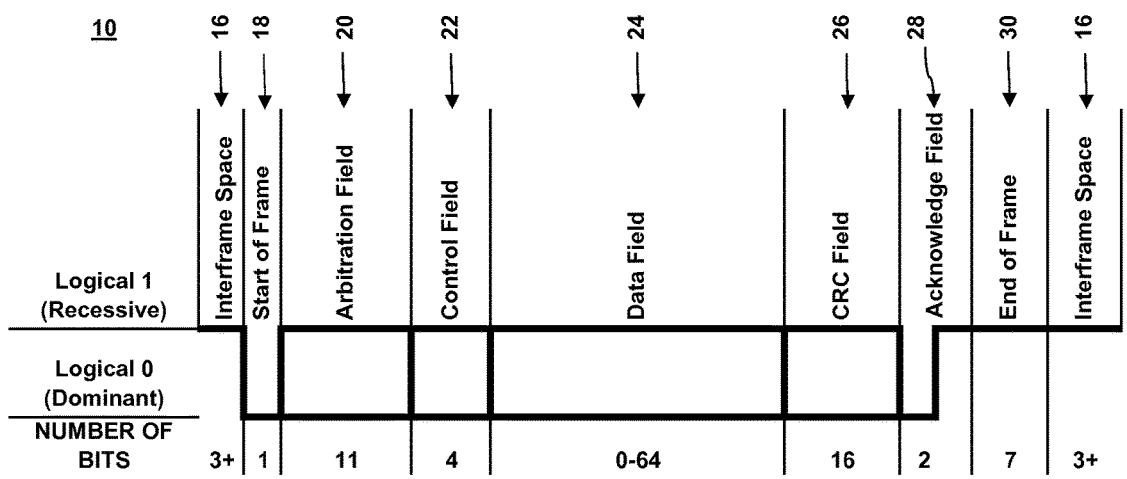
FIG. 2 in a view showing an exemplary frame of serial communication protocol.

FIG. 2 is a timing chart of a data frame 10 of a serial communications bus. The columns represent the different fields in a the data frame 10. A Logical 1 (Recessive) and a Logical 0 (Dominant) data states are represented along the y-axis along with a number of bits for each column. A data frame 10 is separated from preceding frames by a bit field called Interframe space 16. The Interframe space 16 consists of at least three consecutive recessive (1) bits. If a dominant bit (0) is detected following the Interframe space 16, it will be regarded as the Start of frame bit 18. The next column is an Arbitration field 20 is 11 bits and will be discussed below. After the Arbitration filed 20 is a Control field 22 consisting of four bits which indicates the number of bytes in a Data field 24. The Data filed 24 contains the data being sent and can be from zero to eight bytes in length. A CRC field 26 is a sixteen bit cyclical redundancy check field to detect any data and correct data errors. The CRC correction is fifteen bits with the sixteenth bit being a recessive (1) bit. An Acknowledge field 28 is two bits. An End of Frame field 30 is seven recessive (1) bits and is used to mark the end of the data frame 10.

The arbitration filed 20 is analogous to an address field, but since the CAN bus is semi-asynchronous, any ECU on the bus can transmit at any time which can cause bus contention issues. Some ECUs will need to have priority over other modules. For example, a braking system ECU will need to have priority over an entertainment ECU. The bit-wise arbitration method of contention resolution discussed above will be utilized and the braking system ECU will be assigned a lower numerical value bus address. Since lower order value of addresses are dominant over the higher value of addresses, the braking system ECU will dominate over the entertainment ECU.

When receiving data from the bus 101, the communication transceiver 110 converts and buffers the data stream signal levels from the bus 101 to signal levels that the anti-spoof module 108. When transmitting, the communication transceiver 110 converts the data stream from the anti-spoof module 108 to the levels of the bus 101. For example, signal levels on a CAN bus may range from −3 Volts to +32 Volts, and the anti-spoof module 108 controller may employ TTL (transistor-transistor logic) logic and may be able to handle at most a 0 to +5 Volt swing in voltage. The communication transceiver 110, e.g., a CAN transceiver, will convert the transmitted and received data signals to the appropriate signal voltage levels. In addition, the CAN transceiver must be able to suppress any transient voltage spikes from −150 Volts to +100 Volts.

The bus 101 may be implemented using any suitable type of network configuration. For example, in one embodiment, the bus 101 may operate using standard protocols, such as controller-area network (CAN) protocols. By way of non-limiting examples, the bus 101 may be implemented as a single wire or may be two wires (e.g., twisted pair) that transmit messages from one ECU to another ECU and to other desired vehicle components. In other non-limiting examples, the bus 101 may be implemented using coaxial cable or fiber optic cable, or may be implemented wirelessly using radio frequency signaling. Further, the bus 101 may be implemented using any suitable network topology known in the art, such as point-to-point, star, bus, ring, mesh, tree, daisy chain, etc.

The bus 101 may also be connected to a telematics unit to permit external ECUs to connect to the bus 101 of an in-vehicle network via a telecommunications link. A telematics unit, as is known, may send, receive and store information via telecommunication devices with regard to various vehicle components such as sensors, instrumentation, wireless network status and communications, road conditions, road safety, etc.

In one example, the anti-spoof module 108 can be accomplished with an array of discrete logic gates. The address of an ECU can be hardwired into the anti-spoof module 108, and when a received address matches the ECU's transmit address, the logic circuit can send the NACK message causing any modules on the bus 101 to disregard the spoof message. A logic gate, as is known, is an elementary building block of a digital circuit.

According to another example, a programmable logic device (PLD), a field programmable gate array (FPGA), or an embedded controller can be utilized as the anti-spoof module 108. A PLD is an electronic component used to build reconfigurable digital circuits, as is known. Unlike a logic gate, which has a fixed function, a PLD has an undefined function at the time of manufacture. Before the PLD can be used in a circuit it must be programmed with a desired logic schema. For example, the PLD can be programmed to emulate the discrete logic gates, as described above. FPGAs contain an array of programmable logic blocks, and a hierarchy of reconfigurable interconnects that allow the blocks to be "wired together." The logic blocks can be configured to perform complex combinational functions, or merely simple logic gates like AND and XOR. An embedded controller is a microcontroller in system that handles various system tasks that the operating system does not handle.

In yet another example, the processor in the ECU 102 can execute programming to monitor addresses on the bus 101. If the monitoring program detects that an incoming message on the bus 101 has the same address as the ECU 102 outgoing address, and the ECU 102 did not send the message, the monitoring program can then send the NACK message to the bus 101 and cause the spoofed message to be disregarded by the other modules on the bus 101.

In some instances, the ECU 102 address is dynamic and will change from time to time. Therefore, an advantage of using an embedded controller or the processor of the ECU 102 is that it can be programmed to learn addresses of the ECU 102 as they change. For example, the processor of the controller 104 can execute code to monitor the ECU 102 outgoing originated messages and store the ECU 102 outgoing addresses in memory and then place the outgoing addresses of the ECU 102 into the anti-spoof module 108.

An feature of the ECU 102 sending NACK messages to notify devices on the bus 101 to disregard spoofed messages is that an attacker will be forced off the bus 101 by the repeated NACKs. For example, the attacker sends a series of spoof messages, the ECU 101 detects the spoofed messages and responds with NACKs. After a threshold number of NACKs, the originating spoofing device's CAN bus controller will go into a bus off state, removing the originating spoofing device off the bus 101. In the bus off state, the node is not permitted to communicate on the bus. For example, the ISO 11898-1:2003 CAN Bus standard permits a transmit error (NACKs) count of 256 before forcing the spoofing device's CAN controller to the bus off state.

Figure 3:
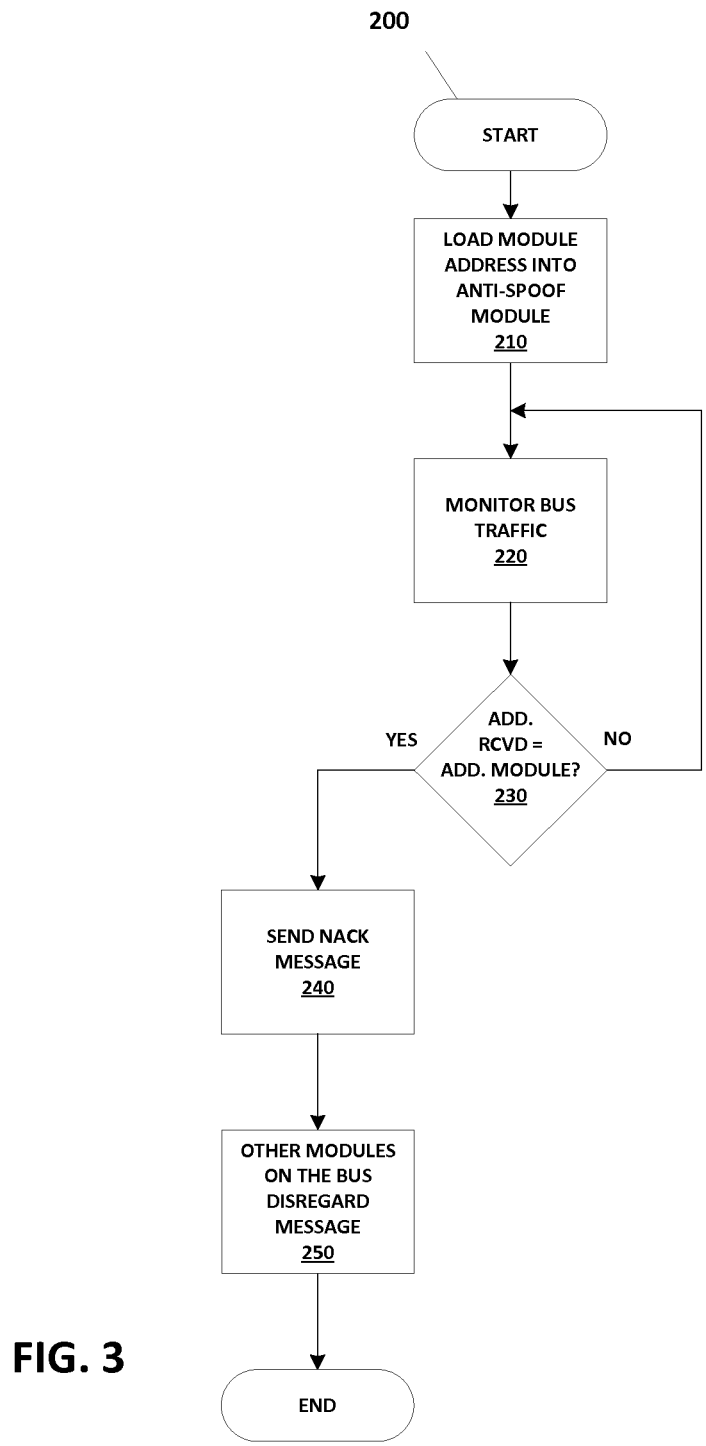
FIG. 3 is a process flow diagram illustrating an exemplary process for the system of FIG. 1.

FIG. 3 is a process flow diagram illustrating an exemplary process 200 for the anti-spoof module 108 which can be carried out in hardware or software.

The process 200 begins in a block 210, in which an address of the ECU 102 is loaded into the anti-spoof module. For example, ECU 102 may have a hexadecimal address of 1A0h, which address is then loaded into the anti-spoof module 108. Next, in a block 220, the traffic on the bus 101 is monitored for any received spoof messages, e.g., the received message has an originating address of 1A0h, the same as ECU 102. Next, in a block 230, a determination is made if one such message has been received. If a spoofed message is not received in the block 230, the anti-spoof module will return to the block 220. If a spoofed message has been received, then, in a block 240, a NACK message is sent out on the bus 101 indicating an error occurred. Next in a block 250, the modules on the bus 101 will disregard this spoof message. Following the block 250, the process 200 ends. Alternatively, or additionally, the process 200 could return to the block 200 to continue to monitor bus 200 traffic.

As used herein, the adverb "substantially" modifying an adjective means that a shape, structure, measurement, value, calculation, timing, etc. may deviate from an exact described geometry, distance, measurement, value, calculation, timing, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method for preventing spoofing in an automotive network, the method comprising:
   storing at least one address of a first vehicle electronic control unit;
   detecting at least one message from a plurality of second electronic control units on a vehicle communications bus, the at least one message having an originating address that matches the at least one address of the electronic control unit;
   determining that said at least one message was sent by a source other than the electronic control unit;
   determining that the source other than the electronic control unit is an originating spoofing device;
   generating and transmitting a negative acknowledgment (NACK) message to at least one module on the vehicle communications bus in the automotive network, instructing the plurality of second electronic control units to take no action on the at least one message; and
   forcing the originating spoofing device to an off bus state after a predetermined number of NACKs is received, the off bus state being a removal of the originating spoofing device from the vehicle communications bus.

2. The method of claim 1, wherein the detecting is performed by a monitoring program executed by a processor of the electronic control unit.

3. The method of claim 1, wherein the detecting is performed by an array of discrete logic gates.

4. The method of claim 1, wherein the vehicle communications bus is part of a vehicle network that includes a wireless network.

5. The method of claim 1, wherein the at least one message includes sensor data.

6. The method of claim 1, wherein the electronic control unit determines that the at least one message was sent by a source other than the electronic control unit by monitoring at least one transmitted message of the electronic control unit.

7. The method of claim 1, wherein the at least one address of the electronic control unit is dynamic.

8. A system for preventing spoofing in an automotive network, comprising:
   an electronic control unit including a hardware processor:
   an application executable by the processor, the application configured to implement: detecting at least one message from a plurality of electronic control units on a bus in an automotive network and the at least one message having an originating address that matches an at least one address of the electronic control unit;
   determining that said at least one message was sent by a source other than the electronic control unit;
   determining that the source other than the electronic control unit is an originating spoofing device;
   generating and transmitting a negative acknowledgment (NACK) message to at least one module on the vehicle communications bus in the automotive network, instructing the plurality of electronic control units to take no action on the at least one message; and forcing the originating spoofing device to an off bus state after a predetermined number of NACKs is received, the off bus state being a removal of the originating spoofing device from the vehicle communications bus.

9. The system of claim 8, wherein the automotive network is a wireless network.

10. The system of claim 8, wherein the messages are transmitted in response to a sensor.

11. The system of claim 8, wherein the application determines the at least one address of the electronic control unit by monitoring at least one transmitted message of the electronic control unit.

12. The system of claim 8, wherein the at least one address of the electronic control unit is dynamic.

13. A computer program product for preventing spoofing in an automotive network, the computer program product comprising a non-transitory computer storage medium having instructions embodied thereon, which when executed by a processor of an electronic control unit cause the electronic control unit to implement:

detecting at least one message from a plurality of electronic control units on a bus in an automotive network and the at least one message has an originating address that matches an at least one address of the electronic control unit;

determining that said at least one message was sent by a source other than the electronic control unit;

determining that the source other than the electronic control unit is an originating spoofing device; and generating and transmitting a negative acknowledgment (NACK) message to at least one module on the vehicle communications bus in the automotive network, instructing the plurality of electronic control units to take no action on the at least one message; and forcing the originating spoofing device to an off bus state after a predetermined number of NACKs is received, the off bus state being a removal of the originating spoofing device from the vehicle communications bus.

14. The computer program product of claim 13, wherein the automotive network is a wireless network.

15. The computer program product of claim 13, wherein the automotive network is connected to a telematics unit.

16. The computer program product of claim 13, wherein the messages are transmitted in response to a sensor.

17. The computer program product of claim 13, wherein the computer program product determines the at least one address of the electronic control unit by monitoring at least one transmitted message of the electronic control unit.

18. The computer program product of claim 13, wherein the at least one address of the electronic control unit is dynamic.

\* \* \* \* \*